United States Patent [19]

Irvin

[11] 4,388,444

[45] Jun. 14, 1983

[54] PREPARING BLENDS OF A SYNTHETIC RUBBER WITH A POLY(ARYLENE OXIDE) BY DISTILLATIVE DISPLACEMENT

[75] Inventor: Howard B. Irvin, Bartlesville, Okla.

[73] Assignee: Phillips Petroleum Company, Bartlesville, Okla.

[21] Appl. No.: 375,168

[22] Filed: May 5, 1982

[51] Int. Cl.$^3$ .............................................. C08L 71/04
[52] U.S. Cl. ...................................................... 525/92
[58] Field of Search ............................. 525/92; 524/505

[56] References Cited

U.S. PATENT DOCUMENTS

| | | | |
|---|---|---|---|
| 3,458,602 | 7/1969 | Pollock | 260/880 |
| 3,639,508 | 2/1972 | Kambour | 260/876 |
| 3,835,200 | 9/1974 | Lee | 260/876 |
| 3,994,856 | 11/1976 | Katchman | 260/42.47 |
| 4,080,403 | 3/1978 | Gergen | 260/876 |
| 4,166,055 | 8/1979 | Lee | 260/30.6 |
| 4,167,507 | 9/1979 | Haaf | 525/92 |
| 4,256,853 | 3/1981 | Naylor | 525/92 |
| 4,283,503 | 8/1981 | Wright | 525/89 |

*Primary Examiner*—Paul R. Michl

[57] ABSTRACT

A rubber from a solution polymerization process dissolved in a lower boiling cycloaliphatic hydrocarbon is contacted countercurrently in column means with hot higher boiling aromatic hydrocarbon vapor. The lower boiling cycloaliphatic solvent is stripped out overhead and displaced by the higher boiling aromatic which condenses to form a rubber-in-aromatic solvent solution. The rubbery copolymer-in-aromatic solvent can be readily blended with a poly(arylene oxide) solution in aromatic solvent. The resulting rubber/poly(arylene oxide) blend in the higher boiling aromatic solvent can be readily steam-stripped to form a rubber/poly(arylene oxide) polymer mixture crumb. Optionally, the co-mixed polymers in the higher boiling aromatic solvent are flash concentrated prior to steam-stripping.

22 Claims, 1 Drawing Figure

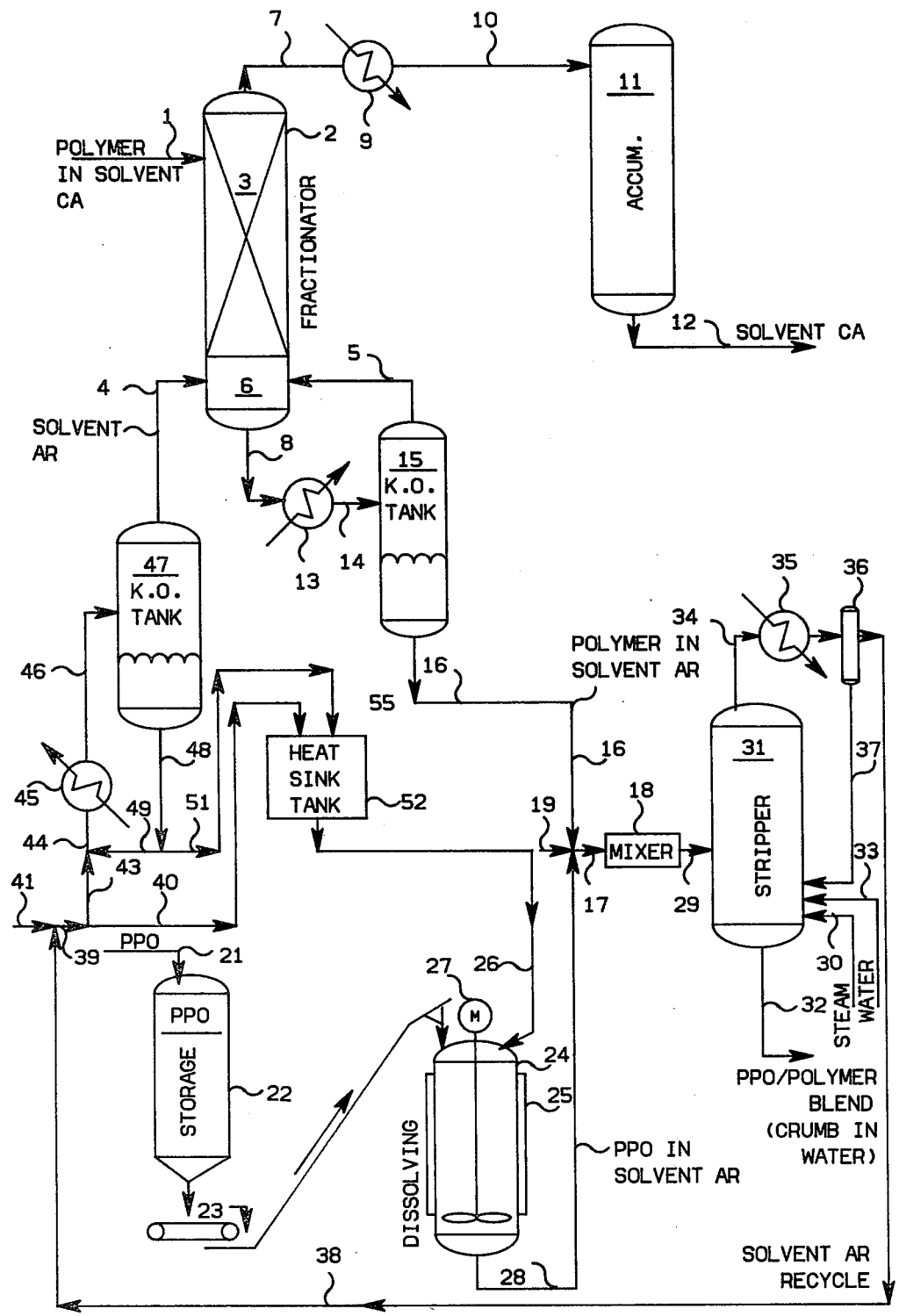

PREPARING BLENDS OF A SYNTHETIC RUBBER WITH A POLY(ARYLENE OXIDE) BY DISTILLATIVE DISPLACEMENT

FIELD OF THE INVENTION

High-molecular weight poly(arylene ethers) are high performance engineering thermoplastics possessing relatively high-melt viscosities and softening points, i.e., in excess of 275° C. The poly(arylene ethers) are useful for many commercial applications requiring high-temperature resistance including formation of films, fibers and molded articles. Poly(arylene ethers) are described in numerous publications including such as Hay U.S. Pat. Nos. 3,306,874 and 3,306,875, and Stamstoff U.S. Pat. Nos. 3,257,357 and 3,257,358.

Synthetic rubbers, such as the solution-prepared copolymers of conjugated dienes with monovinylarenes, have many useful and desirable properties. Unique and desirable blends of these rubbers with the poly(arylene oxides), particularly poly(phenylene oxides), have given every indication of being very useful for many applications where impact resistance is needed by the poly(arylene oxide), or increased strength is needed by the rubber.

However, it has become apparent that very intimate blending is required to form useful blends. The poly(arylene oxides) and the solution-prepared synthetic rubbers just are not truly compatible. Prior art taught methods of mixing/blending have been unimaginative and only partially successful.

For example, mastication of a minor amount of a poly(phenylene oxide) with a major amount of a rubbery butadiene/styrene copolymer produces blends which apparently are not sufficiently intimate. The resulting blends while exhibiting some mutual improvement in product properties yet have not shown the hoped for extent of improvement in properties of the rubbery copolymers which it has been hoped might be obtainable by inclusion of the poly(arylene oxide) as the blending component.

Other approaches have considered blending of solutions of the rubber and of the poly(arylene oxide). However, this approach has not been fully effective either. The preferred synthetic rubbers are normally produced commercially by solution polymerization processes in aliphatic or cycloaliphatic solvents. The solution prepared rubber typically already is dissolved in cyclohexane as a rubber cement resulting from the solution polymerization process. Unfortunately, the poly(arylene oxide)s are not readily soluble in such solvents, but are dissolvable in aromatic hydrocarbons. The two differing solvent solutions could be simply intermixed in suitable proportions. Steam-stripping then would recover the rubber/poly(arylene oxide) admixture. However, the resulting mixed organic solvents would have to be dried and undergo difficult fractionation to separate the solvents for individual recycle.

It is theoretically possible to polymerize the diene and monovinylarene in a mixed aliphatic/aromatic solvent. The poly(arylene oxide) could be dissolved in a similar mixed solvent of suitably high aromatic content. The resulting solutions then could be intermixed, and steam-stripped to recover the polymeric blend. After drying, the mixed solvent would be reused. Solvent fractionation in this mode would not be necessary. This method sounds economically attractive. Unfortunately, difficulties may be encountered in inferior rubbery copolymers produced in aromatic solvents.

BRIEF SUMMARY OF THE INVENTION

I have discovered a distillative displacement method utilizing a packed column means to conveniently convert a rubber cement composed of a rubbery copolymer-in-cycloaliphatic hydrocarbon solvent to a solution of the rubbery copolymer in aromatic hydrocarbon solvent. This rubber-in-aromatic solvent cement then is admixed with poly(arylene oxide) in aromatic solvent solution in any desired proportion. The resulting polymeric blend is recovered from the aromatic solvent by such means as steam-stripping, or by flash evaporation followed by steam-stripping.

I use poly(phenylene oxide) and poly(phenylene ether) as synonomous terms, and as exemplary of poly(arylene oxides) generally.

I use herein cyclohexane as typical and preferred of liquid cycloaliphatic hydrocarbon solvents used in solution polymerization to produce rubbery copolymers of a conjugated diene/monovinylarene suitable for blending with a poly(arylene oxide); and toluene as typical and preferred of liquid aromatic hydrocarbon solvents for poly(arylene oxide) dissolution and subsequent blending with the rubbery copolymer.

BRIEF DESCRIPTION OF THE DRAWING

A rubbery copolymer 1 dissolved in cyclohexane (copolymer in Solvent CA; CA=cycloaliphatic) is fed to the top of a fractionator 2, through which toluene 4, 5 vapors are fed at the bottom 6. The overhead 7 is cyclohexane vapor with minor traces of toluene. Rubbery copolymer now dissolved in toluene is taken as bottoms 8, and flash-concentrated 15. Poly(phenylene oxide) 23 is separately dissolved 24 in hot toluene.

The solution of poly(phenylene oxide)-in-toluene 28 and the concentrated rubber-in-toluene solution 16 are admixed 18 in whatever proportion desired, and steam-stripped 31 to recover the rubber/poly(phenylene oxide) blend 32 as crumb suspended in water.

Recovered toluene is recycled 38 (Solvent AR; AR=aromatic) to re-boiler means 45 and to poly(phenylene oxide) dissolving 24, in accordance with desired temperature control of the toluene for dissolving poly(phenylene oxide). Toluene vapors 4 and 5 to the fractionator bottom 6 are obtained in part 4 by reboiling 45 recycle toluene 43 from the recovery 31 of the rubber/poly(phenylene oxide) blend, and in part 5 from a flash concentration step 15 for the rubber-in-toluene solution 8.

The advantage of flash concentrating 15 the rubbery copolymer-in-toluene solution 8 before subsequent removal of remaining solvent from the blend 29 by such as steam-stripping 31 is a much lower overall steam consumption and a much smaller stripper-condenser means 35.

DESCRIPTION OF THE PREFERRED EMBODIMENT

A rubbery copolymer in cyclohexane cement, containing about 14, weight percent copolymer and at about 145° F. from solution polymerization, is fed 1 to the upper area of a fractionation means 2 which is preferably of a packed column 3 type. The descending rubber-in-cyclohexane solution is contacted counter-currently in the packed column means by rising hot higher boiling toluene vapors. Toluene vapors (Solvent AR;

AR=aromatic hydrocarbon) are added 4 and 5 respectively at about 350° F. and about 247° F. to the lower area 6 of the fractionation means 2. The (higher boiling) toluene vapors rise upwardly through the packed column 3 and thus upwardly through the descending rubber-in-cyclohexane solution. The lower boiling cyclohexane is stripped out overhead and displaced by toluene, resulting in cyclohexane (lower boiling) overhead 7, and rubber-in-toluene solution as bottoms 8. The cyclohexane overhead 7, containing about 2 percent by weight toluene, is condensed 9 by indirect heat exchange means with such as cooling water, accumulated 10, 11, and ultimately recycled 12 (Solvent CA) as diluent solvent for reuse in solution polymerization (not shown). The small amount of toluene (less than 2 weight percent) remaining in the cyclohexane solvent does not cause undue problems in reuse of the solvent diluent during polymerization.

The bottoms 8 of rubbery copolymer-in-toluene solution are heated 13, by such as indirect heat exchange with high pressure steam, and taken 14 to a knockout tank (K.O. tank) means 15 for flash concentration to produce a concentrated rubber-in-toluene stream as bottoms 16. The resulting overhead toluene vapor 5 from the flash concentration knockout tank 15 provides the aforementioned toluene vapors at about 247° F. and thus a portion of the needed heat to the lower portion 6 of fractionation means 2.

Further heat, and usually most of the heat, to lower portion 6 of fractionation means 2 is supplied by superheated toluene vapor 4 provided from the recycle toluene reboiler 45, operating at such as 350° F. and 72 psia, passing 46 to knockout tank means 47 and then 4 to fractionator bottom 6. The toluene recycle source 44 to reboiler 45 is described hereinafter.

Flash evaporation 15 provides a rubber-in-toluene concentrated solution 16, of such as about 20 weight percent solids, which is removed 16 from knockout tank 15 and taken 17 to mixer 18. Optionally, extender oil 19 can be added prior to mixer 18 as shown, if desired; or, alternatively can be added separately to either stream 16, 28, or into the mixer directly.

Separately, poly(phenylene oxide) 21 (PPO) is received as a granular or powdered material, usually stored 22 for convenience, and conveyed 23 as needed to dissolving tank 24, which can be low pressure steam jacketed 25 as shown in the drawing. In the dissolving tank means 24, poly(phenylene oxide) as needed is mixed with contained warm liquid toluene 26 at about 140° F. by mixing means 27. The resulting poly(phenylene oxide)-in-toluene solution is taken 28, 17 from the mixing tank 24 to a mixer or blender means 18 which can be such as an in-line blender. At mixer means 18 the streams of rubber-in-toluene 16 and poly(phenylene oxide)-in-toluene 28, optionally further with extender oil 19, are admixed to produce a mixed stream 29 of poly(phenylene oxide)/rubber/toluene/optionally extender oil.

Mixed stream 29 is steam-stripped 31 with steam 30 to obtain a crumb-in-water 32 blend of poly(phenylene oxide)/rubbery copolymer (crumb) suspended in water which can be further processed (not shown) as needed or desired by conventional dewatering, drying, and packaging. Added water 33 is used in steam-stripper 31 to provide enough water for the crumb-in-water transfer 32. Optionally, if desired, after the blending means 18, and before the steam-stripping 31, the mixed polymers-in-toluene 29 can be partially concentrated by flash-evaporation (not shown), producing an additional recycle toluene stream which can be combined with other recycle toluene 38. The overhead 34 toluene vapor and steam from steam-stripper 31 is condensed 35, such as indirect heat exchange with cooling water, and any water phase separated in decanter means 36. The separated toluene is recycled 38. The separated water can be recycled 37 to the steam-stripper 31.

Recycle toluene 38 is used in part 39, 40, 26 for poly(phenylene oxide) dissolving 24 requirements. Make-up toluene 41 typically is added to the recycle toluene 38 as needed to replace normal losses of solvent, forming mixed toluene stream 39. Of course, make-up toluene can be added elsewhere in the system as may be convenient. A portion of recycle toluene 38 or mixed toluene 39 is sent 43, 44 to reboiler means 45, heated by such as indirect heat exchange with high pressure steam, to produce toluene vapors overhead 46 to knockout pot (K.O. tank) means 47. Hot liquid toluene is removed 48 from knockout pot means 47, and a portion of 48 returns 49, 44 to the reboiler 45.

A portion 51 of the hot liquid toluene 48 from the toluene reboiler knockout means 47 is taken to mix with cool mixed recycle toluene 40, and to a toluene heat sink tank means 52 which preferably is heated to such as 160° F. The sidedraw stream 51 helps limit the buildup of any high boiling compounds by being removed ultimately to the poly(phenylene oxide)/polymer blend 32.

A unique advantage of my system lies in the use of hot toluene vapors to the bottom 6 of the fractionation means 2. By using the hot toluene vapors 4 and 5, I not only vaporize the cyclohexane which is taken overhead as a relatively pure stream, but in turn result in a condensed toluene in which the rubbery polymer becomes dissolved during the exchange.

Of course, toluene has a boiling point of about 231° F. (110.6° C.), and cyclohexane about 177° F. (81° C.). Other cycloaliphatic and aromatic solvent pairs can be used. Whichever solvents are employed, the respective boiling points should be sufficiently disparate as to permit effective exchange in the column distillative displacement.

The aromatic solvent for the poly(arylene oxide) can be such as the normally liquid aromatic hydrocarbons such as benzene, toluene, m- or o-xylene, ethylbenzene, and the like, whose boiling point is not too high for effective steam-stripping from the poly(phenylene oxide).

Poly(arylene Oxide)

The poly(phenylene ether) or poly(phenylene oxide) resins are those having repeating structural units of the formula

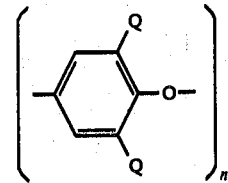

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon, radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of poly(phenylene ether) resins corresponding to the above formula is described in the above-mentioned patents of Hay and Stamatoff. Especially preferred poly(phenylene ether) resins for purposes of the present invention are those having alkyl substitution in the two positions ortho to the oxygen ether atom—i.e., where each Q is alkyl, most preferably, having from 1 to 4 carbon atoms. The presently most preferred poly(phenylene ether) resin for purposes of the present invention is poly(2,6-dimethyl-1,4-phenylene)ether (each Q is methyl).

Rubbery Block Copolymer

The solution-polymerized copolymers useful in the process of this invention can be chosen from any of the copolymers of at least one conjugated diene hydrocarbon with at least one hydrocarbon monovinylarene, characterized as rubbery, containing at least one block of homopoly(monovinylarene) or at least one resinous block of diene/monovinylarene copolymer predominating in copolymerized monovinylarene and sufficient in size to assist in providing at least a degree of compatability with a poly(arylene oxide), and are normally solid.

Among the suitable rubbery diene/monovinylarene block copolymers are the rubbery copolymers which can be structurally described by the formulae $(A-B)_nY$, A-B-A, A/B-A, and the like, wherein A represents a block of polymerized monovinylarene which can be and preferably is homopolymeric, B a block of polymerized conjugated diene which can be and preferably is homopolymeric, A/B a randomized or tapered diene/monovinylarene block, Y the residue of a polyfunctional coupling agent, and n an integer representing an average of at least 2 and only ideally equals the number of active sites on the polyfunctional coupling agent. Generally n is in the range of 2 to 6. Of course, n can and does frequently=1, at least in part, in any coupled copolymer due to lack of full coupling efficiencies. $SiCl_4$, for example, results in a mixture of coupled species where n=all of 1, 2, 3, and 4.

Conjugated diene hydrocarbon monomers useful in the preparation of such copolymers include those known for use in solution copolymerization, generally containing 4 to 12, preferably 4 to 8, carbon atoms per molecule. Examples include 1,3-butadiene, isoprene, 2,3-dimethyl-1,3-butadiene, piperylene, 3-butyl-1,3-octadiene, 2-phenyl-1,3-butadiene, and the like, and mixtures thereof. Presently preferred are 1,3-butadiene and isoprene due to availability, properties, and favorable cost.

The monovinylarene hydrocarbon monomers employed include those known for use in solution copolymerization, generally containing 8 to 20, more usually 8 to 12, carbon atoms per molecule. Examples include styrene, 2-methylstyrene, p-vinyltoluene, p-t-butylstyrene, and the like, and mixtures thereof. Presently preferred are styrene and α-methylstyrene due to availability and cost.

The rubbery block copolymers generally contain in the range of about 90:10 to 50:50 parts by weight of conjugated diene-monovinylarene, preferably about 80:20 to 60:40. The ratio to produce a rubbery copolymer varies somewhat, since properties change gradually from rubbery to resinous, and depend on monomer ratios, particular monomers, random vs. block nature, and the like.

Presently preferred copolymers are the butadiene/styrene branched block copolymers of about 70:30 weight ratio copolymerized diene:monovinylarene with about 30 parts of polystyrene block, prepared with n-butyllithium-tetrahydrofuran (THF), coupled with $SiCl_4$, inherent viscosity about 1.49 with $M_w$ about 338000 and $M_n$ about 252000 where $M_w$ is weight average molecular weight and $M_n$ is number average molecular weight, and a polymer density about 0.935 (Solprene® 411 copolymers marketed by Phillips Petroleum Co.).

Solution preparation methods of the various suitable block copolymers are well known in the art and need not be elaborated herein. Any organolithium or other alkali metal initiator, preferably monolithium initiator, known in the art can be used to initiate polymerization of the conjugated diene and of the monovinylarene. The amount of initiator used will vary, depending upon the desired molecular weight of the resultant copolymer.

A hydrocarbon diluent solvent is employed in the solution polymerization process to produce the rubbery block copolymer, and can be any of the cycloaliphatic or mixtures of aliphatic and cycloaliphatic, solvents known for use in solution polymerization procedures to prepare the rubber-in-solution (cement). Where a mixed solvent is used, it must be predominantly cycloaliphatic in order to later practice my invention suitably. Diluents useful in solution polymerization processes to produce polymers useful in my process include such as methyl cyclohexane, methyl cyclopentane, cyclohexane, cyclopentane, and the like, and mixtures thereof. While such as n-hexane is well known as useful for solution polymerization techniques generally, such should not be used for the polymerization of the block copolymers of present interest for blending with a poly(arylene oxide) because some gel may tend to be formed in the aliphatic-type solution polymerization resulting in possibly less desirable products for blending purposes. However, some n-alkane can be mixed with the cycloaliphatics. For example, an 85 weight percent purity cyclohexane 15 weight percent aliphatic hydrocarbon solvent is suitable. The amount of diluent used can vary, but usually is about 50 to 2,000 parts by weight per 100 parts by weight of monomer. It also is presently considered undesirable to prepare the rubbery block copolymer in such as benzene, toluene, or other higher boiling aromatic solvent where the copolymer is to be used for blending purposes. For example, if such as toluene is present in the polymerization solvent above a level of about 2 weight percent, a transmetallation reaction may occur which tends to produce low molecular weight polymer. However, a small amount of toluene (less than about 2 weight percent of the solvent) in recycle cycloaliphatic solvent as such is not deleterious in the solution polymerization step.

A polar compound (such as acyclic or cyclic ethers or tertiary amines) as is known in the art can be employed in the solution polymerization process as randomizing agents and/or to adjust the vinyl content of the polymer.

The solution polymerization process generally is conducted at temperatures in the range of about −13° F. to 302° F., preferably about 77° F. to 257° F. It is convenient to employ a process in which essentially adiabatic conditions are maintained. Polymerization times generally are determined by the temperature, as well as by the reactivities of the components. Normal polymerization times generally are in the range of about 0.1 minute to 24 hours, preferably about one minute to one hour.

Where desired, depending on the type of block copolymer desired, a polyfunctional coupling agent (containing at least two reactive sites) is added to the unquenched reaction mixture at the conclusion of the polymerization reaction to produce a coupled block copolymer. Such agent must be added before any material such as water, acid or alcohol is added. The temperature of the coupling reaction can vary over a wide range and is conveniently the same as that used for polymerization. At normal polymerization temperatures, i.e., above about 25° C., the coupling reaction occurs rapidly, i.e., in the range of several seconds to about one hour.

The multifunctional coupling agents include those multiepoxides, multiisocyanates, multiimines, multialdehydes, multiketones, multianhydrides, esters, multihalides, compounds containing more than one of these functional groups, and any other coupling agents described in the art.

In order to achieve maximum coupling, ideally the optimum amount of polyfunctional coupling agent employed will be that which contains one gram-equivalent of coupling agent for each gram-equivalent of lithium-terminated polymer molecules. It sometimes may be desirable to employ an excess of coupling agent such as up to 125 mole percent in excess of the stoichiometric amount of coupling agent.

In the alternative, the conjugated diene can be first polymerized using a di/(or multi)lithium initiator, and thereafter monovinylarene polymerized thereonto to form A-B-A or (A-B-)$_n$L wherein L represents a residue which originates from the initiator.

The resulting copolymer-in-cycloaliphatic solvent (cement) generally contains about 10 to 25, more usually about 14, weight percent copolymer.

Masterbatch of Poly(phenylene Oxide)

The amount of poly(phenylene oxide) used in preparing the toluene solution masterbatch can range broadly from about 1 to 30, preferably about 5 to 20, weight percent polymer in aromatic solvent. The weight percent chosen depends at least partially on the polymeric blend composition(s) to be prepared in the blending step.

Blend Composition

The weight ratio of poly(phenylene oxide):conjugated diene-monovinylarene rubbery block copolymer can range broadly from about 99:1 to 5:95.

In the presently preferred rubbery compositions dominant in rubbery block copolymer and having high impact strength, the conjugated diene-monovinylarene rubbery block copolymer typically will comprise the major component of the blend and the poly(phenylene oxide) the minor portion. The preferred blend composition comprises about 10 to 30 weight percent poly(phenylene oxide), about 0 to 40 weight percent extender oil, and about 50 to 85 weight percent conjugated diene-monovinylarene rubbery block copolymer. All weight percents are based on total blend composition, excluding colourants, fillers, stabilizers, and the like.

Where an extender oil is employed, it should be of a naphthenic type. Paraffinic extender oils are not considered suitable. Aromatic oils are acceptable, though less preferred.

A presently particularly useful composition is a blend of about 20/60/100 weight ratio poly(phenylene oxide)/naphthenic extender oil/Solprene® 411 copolymer prepared by solution blending according to the process of my invention. Such compositions provide easy-processing low-cost matrices for use in motor mounts, shoe soles, wire and cable coverings, and the like, and exhibit good creep resistance.

Compositions and blends predominating in the proportion of a poly(phenylene oxide) resulting from the process of this invention can be used essentially in the same way as known poly(phenylene ether) compositions, such as thermoplastic engineering resins, e.g., in injection molding, compression molding, or for the formation of fibers or films. Typically such compositions can be molded into small appliance housings. Minor amounts of the rubbery block copolymer add impact resistance to the engineering resin, and estend importantly the range of its uses and applications. Typically, such amounts are in the range of 1–10, more usually 1–5, weight percent rubbery block copolymer to 99–90, more usually 99–95, poly(phenylene oxide).

The blends further may contain other additives to plasticize, extend, reinforce, fill, lubricate, prevent oxidation, flame retard, dye, pigment, etc., the polymeric composition. Such additives are well known in the art and may be incorporated in any convenient manner without departing from the scope of the invention.

The disclosure, including data, has illustrated the value and effectiveness of my invention. The examples, the knowledge and background of the field of the invention and the general principles of polymer chemistry and of other applicable sciences have formed the bases from which the broad descriptions of my invention including the ranges of conditions and the generic groups of operant components have been developed, and formed the bases for my claims here appended.

I claim:

1. A process for preparing a poly(arylene oxide) resin/rubbery diene/monovinylarene block copolymer blend which comprises:
   (a) contacting in fractionation means a rubbery diene/monovinylarene polymer-in-cycloaliphatic solvent solution with hot aromatic hydrocarbon solvent vapors, thereby taking cycloaliphatic solvent vapors as overhead, and producing a rubbery copolymer-in-aromatic hydrocarbon solvent bottoms,
   (b) flash evaporating at least a portion of said aromatic solvent from said rubbery copolymer-in-aromatic solvent bottoms, thereby producing aromatic solvent vapor overhead, and a stream of concentrated copolymer-in-aromatic solvent,
   (c) dissolving poly(arylene oxide) resin in hot aromatic solvent to produce a poly(arylene oxide)-in-aromatic solvent solution,
   (d) blending said concentrated rubbery copolymer-in-aromatic solvent solution with said poly(arylene oxide)-in-aromatic solvent solution to produce a blended polymeric admixture-in-aromatic solvent,
   (e) steam-sripping said blended polymeric admixture in aromatic solvent, thereby producing a recycle aromatic solvent stream and a blended rubbery copolymer/poly(arylene oxide) crumb in water, and (f) recycling aromatic solvent from said steam-stripping at least in part to said (c) poly(arylene oxide) dissolving step and said (a) rubber-in-cycloaliphatic solvent contacting steps.

2. The process of claim 1 further taking hot aromatic solvent vapors overhead from said flash evaporating concentrating step (b) as at least a portion of said hot aromatic solvent vapors to said fractionation means in said contacting step (a).

3. The process according to claim 2 wherein said recycle aromatic solvent from said step (e) is heated by reboiler means prior to said contacting in said fractionation means.

4. The process according to claim 3 wherein said poly(arylene oxide) resin is selected from compounds of the formula

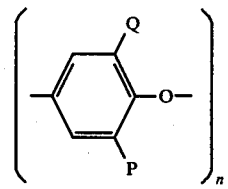

wherein the oxygen ether atom of one unit is connected to the benzene nucleus of the next adjoining unit, n is a positive integer of at least 50, and each Q and P are monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

5. The process according to claim 4 wherein said diene/monovinylarene rubber block copolymer contains a copolymerized weight ratio of about 90:10 to 50:50 conjugated diene:monovinylarene, and exhibits an $M_n$ of 50,000 to 1,000,000.

6. The process according to claim 5 wherein said rubbery block copolymer contains a copolymerized weight ratio of about 80:20 to 60:40 diene:monovinylarene, and exhibits an $M_n$ of about 100,000 to 300,000.

7. The process according to claim 6 wherein said rubbery copolymer is characterized as a radial block copolymer.

8. The process according to claim 7 wherein said rubbery block copolymer is a butadiene/styrene copolymer; said poly(arylene oxide) is a poly(phenylene oxide); said cycloaliphatic solvent comprises cyclohexane; and said aromatic solvent comprises toluene.

9. The process according to claim 8 wherein said butadiene/styrene copolymer contains a copolymerized weight ratio of about 70 butadiene:30 styrene.

10. The process according to claim 8 or 9 wherein said poly(arylene oxide) is a poly(arylene oxide) is a poly(2,6-dimethyl-1,4-phenylene) ether resin.

11. The process according to claim 1 wherein said rubber-in-cycloaliphatic solvent contains about 10 to 25 weight percent solids.

12. The process according to claim 1 wherein said poly(arylene oxide)-in-aromatic solvent contains about 1 to 30 weight percent solids.

13. The process according to claim 1 wherein said crumb blend contains about 99:1 to 5:95 weight ratio of poly(arylene oxide):rubbery block copolymer excluding any other components or additives.

14. The process according to claim 1, 8 or 13 further including 0 to 40 weight percent of an extender oil in said crumb.

15. The process according to claim 14 wherein said extender oil is added to at least one of said poly(arylene oxide)-in-aromatic solvent, said rubbery copolymer-in-aromatic solvent, or both.

16. The process according to claim 1 further comprising the step of flash concentrating said blended admixture of said poly(arylene oxide) and said rubbery copolymer in aromatic solvent prior to said steam-stripping.

17. The process according to claim 1 further comprising the step of reboiling said recycle aromatic solvent from said steam-stripping, thereby substantially vaporizing said reboiler aromatic solvent, removing residual liquid aromatic solvent therefrom, and employing the resulting aromatic solvent vapor in said contacting step (a) as at least a portion of said hot aromatic solvent vapors therein.

18. The process according to claim 1 or 17 further comprising the step of recycling said aromatic solvent vapor overhead from said flash evaporating concentrations step (b) to said contacting step (a) as at least a portion of the hot aromatic solvent vapors therein.

19. The process according to claim 1 further comprising condensing and decanting the wet aromatic solvent overhead from said steam-stripping step (e), recycling the resulting water to said steam-stripping, and employing the resulting wet aromatic solvent as said recycle aromatic solvent stream.

20. The process according to claim 1 wherein said aromatic solvent is toluene, benzene, m-xylene, o-xylene, or ethylbenzene.

21. The process according to claim 1 or 20 wherein said cycloaliphatic solvent is cyclohexane, methyl cyclopentane, cyclopentane, methyl cyclohexane, alone, or in admixture with a minor amount of aliphatic solvent.

22. The process according to claim 1, 8, or 13 wherein the resulting crumb blend comprises about 10 to 30 weight percent poly(arylene oxide), 0 to about 40 weight percent extender oil, and about 50 to 85 weight percent rubbery block copolymer.

* * * * *